(12) United States Patent
Stadler et al.

(10) Patent No.: US 6,225,582 B1
(45) Date of Patent: May 1, 2001

(54) STEERING COLUMN ASSEMBLY

(75) Inventors: Peter Stadler, Aurachtal; Horst Schubotz, Wuppertal, both of (DE)

(73) Assignee: Delco Electronics Europe GmbH, Wiesbaden (DE)

( * ) Notice: Subject to any disclaimer, the term of this patent is extended or adjusted under 35 U.S.C. 154(b) by 0 days.

(21) Appl. No.: 09/381,315

(22) PCT Filed: Mar. 20, 1998

(86) PCT No.: PCT/EP98/01649

§ 371 Date: Nov. 23, 1999

§ 102(e) Date: Nov. 23, 1999

(87) PCT Pub. No.: WO98/42540

PCT Pub. Date: Oct. 1, 1998

(30) Foreign Application Priority Data

| Mar. 20, 1997 | (DE) | 197 11 561 |
| Mar. 20, 1997 | (DE) | 197 11 560 |
| Mar. 20, 1997 | (DE) | 197 11 566 |
| Mar. 20, 1998 | (DE) | 197 11 567 |

(51) Int. Cl.$^7$ ................................................. H01H 9/00
(52) U.S. Cl. .................................... 200/61.27; 200/61.54
(58) Field of Search .......................... 200/4, 17 R, 61.27, 200/61.3, 61.31, 61.32, 61.35, 61.36, 61.54

(56) References Cited

U.S. PATENT DOCUMENTS

| 5,895,899 | * | 4/1999 | Sano | 200/61.54 |
| 5,936,215 | * | 8/1999 | Masuda et al. | 200/61.3 |
| 5,952,633 | * | 9/1999 | Leveque et al. | 200/61.54 |
| 5,977,495 | * | 11/1999 | Akimoto | 200/61.54 |
| 6,025,565 | * | 2/2000 | Miyase et al. | 200/61.28 |

FOREIGN PATENT DOCUMENTS

| 44 26 644 | 11/1995 | (DE) | B60R/16/02 |
| 195 24 153 | 1/1997 | (DE) | B60K/37/06 |
| 197 00 175 | 4/1998 | (DE) | B60R/16/02 |
| 0 675 023 | 10/1995 | (EP) | B60R/16/02 |
| 2 306 785 | 5/1997 | (GB) | H01H/27/06 |

* cited by examiner

Primary Examiner—Michael Friedhofer
(74) Attorney, Agent, or Firm—Proskauer Rose LLP

(57) ABSTRACT

A steering column assembly for arranging in an area of a steering column in a motor vehicle comprises a locating device, a centrally arranged support board, and at least one steering column switch. The locating device comprises a receptacle for the support board and at least one laterally-aligned receptacle for the steering column switch. The support board establishes electrical connection between the connections of the steering column switch and the vehicle's control devices allocated to the steering column switch. The control devices allocated to the steering column switch are at least in part arranged on the support board. The ease of servicing such a known steering column assembly is decisively improved in that the receptacle for the support board is radially aligned and the support board can be connected to the locating device from a radial direction.

21 Claims, 5 Drawing Sheets

STEERING COLUMN ASSEMBLY

BACKGROUND OF THE INVENTION

The invention concerns a steering column assembly for arranging in the area of a steering column in a motor vehicle, comprising a locating device, a centrally arranged support board and at least one steering column switch, whereby the locating device comprises a receptacle for the support board and at least one laterally-aligned receptacle for the steering column switch; and whereby the support board establishes the electrical connection between the connections of the steering column switch and the control devices of the vehicle allocated to the steering column switch; and whereby the control devices allocated to the steering column switch are at least in part arranged on the support board. Such a locating device is for example known from EP 0 763 447 A2.

Switches arranged on a steering column assembly are used to operate and control various functions of the vehicle. Such functions can for example be switching the vehicle lights on and off, initiating the turn signals or the windscreen wiper device, operating an automatic cruise control etc. The intention is to allow operation and control of as many functions of a vehicle as possible in close proximity to the steering wheel. Such an arrangement ensures that the driver can reach the controls without having to take whichever hand is necessary for operating the control away from the steering wheel region.

Apart from increasing operational safety, another requirement is simplification in manufacture and assembly of the elements necessary for operating and controlling the various functions. This applies in particular to such components of the switches concerned which are exposed to premature destruction or increased wear.

In its diagram for the state of the art, EP 0 763 447 A2 shows a steering column lever with a locating device attachable to the steering column of a motor vehicle, with two laterally-aligned seats for two steering column switches to which a centrally arranged support board is allocated. This support board on the one hand establishes electrical connections between the connections of the steering column switch and the vehicle's control devices which are allocated to the steering column switch, whereby on the other hand the control devices allocated to the steering column switch are at least partly arranged on the support board. In the known locating device, the electrical connection between the connections of the steering column switch and the support board takes place via plugs which can be plugged into the support board; these plugs are connected via cables to the contacts of the steering column switches. With the steering column assembly known from EP 0 763 447 A2, the support board is essentially configured in a circular shape; it is positioned into the respective receptacle of the locating device in the direction of the axis of the steering column.

A further embodiment of a steering column assembly is known from DE 44 28 883 C1. This steering column assembly too comprises a locating device, a centrally arranged support board and two steering column switches. Here too, the support board is inserted as a ring-shaped component into a receptacle formed in the front of the locating device and aligned coaxially to the longitudinal axis of the steering column assembly. At the same time, the steering column switches with electrical control elements form a firmly interconnected modular unit. The support board comprises press contacts which are laterally formed to it; by way of the said press contacts the contact surfaces of the electrical connections of the respective modular unit comprising steering column switch and switches, can be connected to the strip conductors of the support board. The strip conductors of the support board are connected to plug-in contacts fixed to the support board which, with the support board plugged in, are located in a respective plug-in connector. From the plug-in connector, a loom of cables leads to the respective control devices.

In addition, the support board supports a sensor device by means of which the steering angle of the steering wheel borne by the steering column can be determined. Furthermore, a signal transmission device configured as a so-called helix cable cassette is connected via the support board with the control wires allocated to it.

The known designs for a steering column assembly make it possible in a modular configuration to install various components in the steering-column region in a simple way. In this, the individual components can be attached to the locating device in a confined space, as a functionally pre-tested unit. In addition, by avoiding difficult to handle looms of cables, the installation effort is minimal in the case of the known device.

A problem with the known design of a steering column assembly is the fact that should exchange of the support board become necessary due to a defect, it is necessary to remove the steering wheel and further components, in order to gain access to the support board. For this reason, the support board for example in the device known from DE 44 28 883 C1 is merely configured as a simple lead-type connection between the switches connected to the steering column levers and the control elements which are positioned away from the steering column. For example, by way of these control elements vehicle lights are switched on or off, turn signal indicators are operated, the windscreen wiper device is operated at various speeds or automatic cruise control is activated.

SUMMARY OF THE INVENTION

Starting from the state of the art as explained above, it is the object of the invention to provide a steering column assembly where a support board assuming central functions is arranged in such a way that the said support board is easy to dismantle.

According to the invention, the object derived and shown above is met in that the receptacle for the support board is radially aligned and that the support board is connectable with the locating device from a radial direction.

With the steering column assembly according to the invention, the support board is not only configured as a simple electrical connection between the switches of a steering column lever and a loom of cables, but it accommodates and connects the electronic control elements with the respective switches which are required to initiate and operate certain functions of the vehicle. In this, the support board can be a fully-functional electronic printed circuit board.

In the case of the steering column assembly according to the invention, the control elements are arranged in close proximity to the switches activating their function. In this way, cabling of the vehicle in the steering wheel region can be considerably simplified. Since in the case of the steering column assembly according to the invention, at the same time a receptacle is envisaged which makes it possible to plug the support board (which is equipped with control elements accordingly) into the locating device radially from a lateral direction, the support board can be installed and deinstalled very simply and in a short time. Therefore, in the case of the locating device according to the invention, the support board can also comprise service-intensive components whose unimpeded access must be ensured.

In this it is particularly advantageous if the support board is U-shaped. In a suitable configuration, the U-shape allows direct contact of all switches attached to the locating device. If in addition, the support board can be inserted into a slot provided in the locating device, or if it can be put on the locating device, then the locating device can be laterally slid into the slot of the locating device in the sense of a modular unit. This further facilitates exchange of the support board in the case of repair.

With the steering column assembly according to the invention, it is possible to provide further functions allocated to the steering column in that the locating device comprises a lock receptacle for a cylinder lock switch and that the electrical connection between the connections of the cylinder lock switch and the control devices allocated to the cylinder lock switch of the vehicle is maintained by way of the support board. In this embodiment of the invention, the locating device forms a central supporting unit to which all essential elements necessary for operating the vehicle are attached. In this it is not only favorable if an additional lock receptacle is envisaged on the locating device, but it is equally advantageous if the locating device comprises a receptacle for the detection and control unit of a drive-away security device or an immobilizer. It can also accommodate a signal transmission device for an airbag which is arranged in the steering wheel borne by the steering column.

The easily deinstallable modular configuration of the support board according to the invention, allows a further advantageous embodiment in that the control devices allocated to the cylinder lock switch are at least in part arranged on the support board.

A further particularly advantageous embodiment of the modular support board is achieved in that the steering column switch and/or the cylinder lock switch are disconnectably connected with the locating device; in that the steering column switch and/or the cylinder lock switch comprise a control; in that the control, depending on its manually selectable position, by way of control means acts upon at least one switch element causing signal transmission; and in that the switch element is arranged on the support board. This embodiment of the invention is characterized in that all components necessary for electronic or electrical functions of the steering column assembly are now arranged on a single support board. This support board represents the central control unit and comprises both the strip conductors required for electrical signal transmission and all necessary electronic components such as the control device and the switching elements. In contrast to the state of the art according to DE 44 28 883 C1, no further printed circuit boards are necessary. But rather, the control means arranged separately from the central support board provides the desired electrical function directly via the switch elements controlled by the respective controls. This considerably simplifies production because now only a single printed circuit board needs to be provided. This configuration results in an advantageous separation of mechanically and electrically operated components of the steering column assembly. In this, a spatial de-coupling of mechanical elements on the one hand, and electrical functional elements on the other hand takes place insofar as all electrical functions are concentrated on the support board, while the mechanical control means are arranged in the region of the steering column switches and/or the cylinder lock switch, independent of the support board.

With the last-mentioned embodiment of a steering column assembly the integrity of mechanical and signal-transmitting part is dissolved. Essentially, a steering column assembly comprises an assembly made of purely mechanical components and an assembly of electrical components which are allocated to a support board. Both assemblies represent individual design units. This makes it possible to install the mechanical elements of the steering column separately from its electrical elements and accordingly, to replace them independent from each other in case of a malfunction.

Due to the separation of mechanical and electrical parts, the switch element constituting the essential electrical part of the switch can be pre-assembled on the support board; due to the modular design of the support board, it can be fixed on a group of components and be connected to an also fixed cabling of the group of components; and in the case of malfunction is easy to deinstall. As a result, in the case of a steering column assembly configured in this way, after removal of the support board, only the mechanical part (which essentially comprises the control and the control means) needs to be connected to the steering column assembly. In this way both installation of the steering column switches and/or the cylinder lock switches or the support board, as well as their replacement, are significantly simplified when compared with known designs of a steering column assembly.

At the same time, due to constructional separation of the electrical and mechanical parts of the steering column assembly according to the invention, it is possible to configure both parts optimally in regard to their function and their operational safety. Thus the switch element can easily be arranged in such a way that it is protected from dirt and corrosion. In addition, switch elements can easily be used which, due to their functionality, have a near-unlimited life expectancy. In this way, with a steering column assembly according to the invention, the danger of an electrical defect is also reduced to a minimum.

Transmission of the switch signal generated as a result of moving the position of the control, from the mechanical part of the switch to the switch element, can take place in a mechanical, photoelectrical, inductive, capacitive or magnetic way.

It is further preferred that the support board carry microswitches functioning as mechanical-electrical switch elements by means of which the mechanical activation of the switch is transformed into an electrical signal. Alternatively or in addition to this, the support board can also accommodate further transducers, for example optoelectronic transducers.

According to one embodiment, the steering column switch is connected, by way of a connective element, to a receptacle for the steering column switch of the locating device, and the control of the steering column switch is retained at the connective element. The particular effect consists of a coupling being enabled between the functions of the steering column switch with the electrical or electronic control means housed on the support board, whereby quasi an "electronic steering column switch" can be realized. In this, spatial decoupling between mechanical elements on the one hand and electrical functional elements on the other hand takes place to the effect that all electrical functions are concentrated on the support board, while the control means are located outside the said board, in the region of the steering column switch or components interacting with it.

With a view to non-problematic disposal, the elements connected to a connective element of the steering column switch, for connection to a receptacle for the steering column switch of the locating device (which said elements comprise the mechanical part of the steering column switch) should be made from the same material as the connective element.

A further advantageous embodiment of the invention, in view of resistance to wear and ease of installation, is characterized in that the connective element is a housing which clicks into the receptacle of the locating device.

In the case of mechanical transmission of the switch signal, a preferred embodiment consists of the control means being configured as an axially-movable pin. By means of such pins a swivelling motion can easily be converted into a purely axially directed movement. This makes it possible while maintaining a compact design to select a spatial allocation of a swivellably retained control and a switch element in which the switch element is positioned in a plane normally arranged to the swivelling axis of the control. With a control operated by rotation along its longitudinal axis, respective spatial allocation of the component can be attained in that the control means is a rotatably-held cam.

A form of the control means which is particularly simple and cost-effective in it realization, used for mechanical transmission of the switch signal, is characterized in that the control means is configured as a raised part shaped to the control.

According to a further embodiment, the cylinder lock switch is connected with a lock receptacle of the locating device by way of a connective element, with the cylinder lock switch comprising a lock cylinder as a control. This embodiment is characterized in that ignition lock and locating device form an integral unit, thus significantly simplifying both production and preassembly and assembly of the steering column assembly. Thus, as a result of the integral unit in the shape of the enlarged locating device, all functions which are traditionally assumed by the locating device, can be combined with the function of the cylinder lock switch. The particular effect consists in a coupling of the cylinder lock function with the electrical or electronic control means accommodated on the support board, whereby quasi an "electronic ignition lock" can be realised. Here too, spatial decoupling between mechanical elements on the one hand and electrical functional elements on the other hand takes place to the effect that all electrical functions are concentrated on the support board, while the control means are located outside the said board, in the region of the cylinder lock switch or components interacting with it.

In a further embodiment of the steering column assembly according to the invention, the control devices allocated to the steering column switch and/or the cylinder lock switch are at least partly arranged on the support board which is configured as a printed circuit board, and that the control devices, depending on the switch condition of the switch element, are controllable. The configuration of the support board as a printed circuit board can be used to bring the required electrical connection in a space-efficient and safe way close to the switch element. It is particularly favourable if electronic control circuits are arranged on the support board which is configured as a printed circuit board, with the said control circuits controlling the equipment of the motor vehicle, depending on the switch condition of the switch element. Such an embodiment of the support board makes it possible to locate the control elements which depend on the switch condition of the switch element in a space-efficient way in close proximity to the switch element. In this way expensive cabling can be dispensed with. In addition, the arrangement of switching elements and control elements on a common printed circuit board offers the possibility of creating a central switch unit and control unit of the vehicle, in the region of the steering column, in the location where for reasons of optimal ergonomics, all manually operated control devices should be arranged in close proximity to the steering wheel.

With a view to cost-efficient production and as much freedom in design shape as is possible, it is advantageous if the locating device according to the invention is made from a plastic material. In the case where the locating device comprises a lock receptacle, the wall of the lock receptacle can, at least in sections, be reinforced by reinforcement elements embedded in the plastic. Preferably such reinforcement elements should be made of metal. In this way it is very simple to effectively prevent any breaking out of the lock cylinder from the lock receptacle. However, it is also imaginable that by suitable selection of plastic and shaping the locating device in the region of the lock receptacle, adequate security be provided against breaking the cylinder lock off.

It can be favorable in the production of the locating device, if instead of or in combination with plastic, the locating device is made from a light-metal alloy which contains in particular magnesium and/or aluminum.

A preferred embodiment of the invention, in view of ease of installation and protection of the support board is characterized in that the support board is accommodated by a housing.

A further reduction of the individual components present in the region of the steering wheel can be achieved in that sections of the outer walls of the locating device form the cover of the steering column which is visible from the outside.

A preferred embodiment of the steering column assembly according to the invention provides for a turning angle sensor for registering the steering angle to be provided. The electronic elements of the said sensor are also arranged on the support board. In this way, a further function can be realized, namely the coupling of vehicle functions depending on the turning angle of the steering wheel.

If in addition, the support board accommodates a sensor for registering the torque acting upon the steering column, then there is an option of increasing the comfort by coupling it with a power steering function.

Finally, a further design possibility in the sense of the invention consists of the support board accommodating a receiver device for an HF radio remote control. The area behind the steering wheel is eminently suitable for this because in this location, due to the size of the window areas, HF radiation can penetrate favorably and largely without any disturbance. Thus it is not necessary to provide another place for the HF receiver in the region of the control panel.

There are a multitude of options for the design and improvement of the steering column assembly according to the invention.

One embodiment of the present invention is more fully described be low in conjunction with the following drawings.

DETAILED DESCRIPTION OF THE INVENTION

Figure 1:
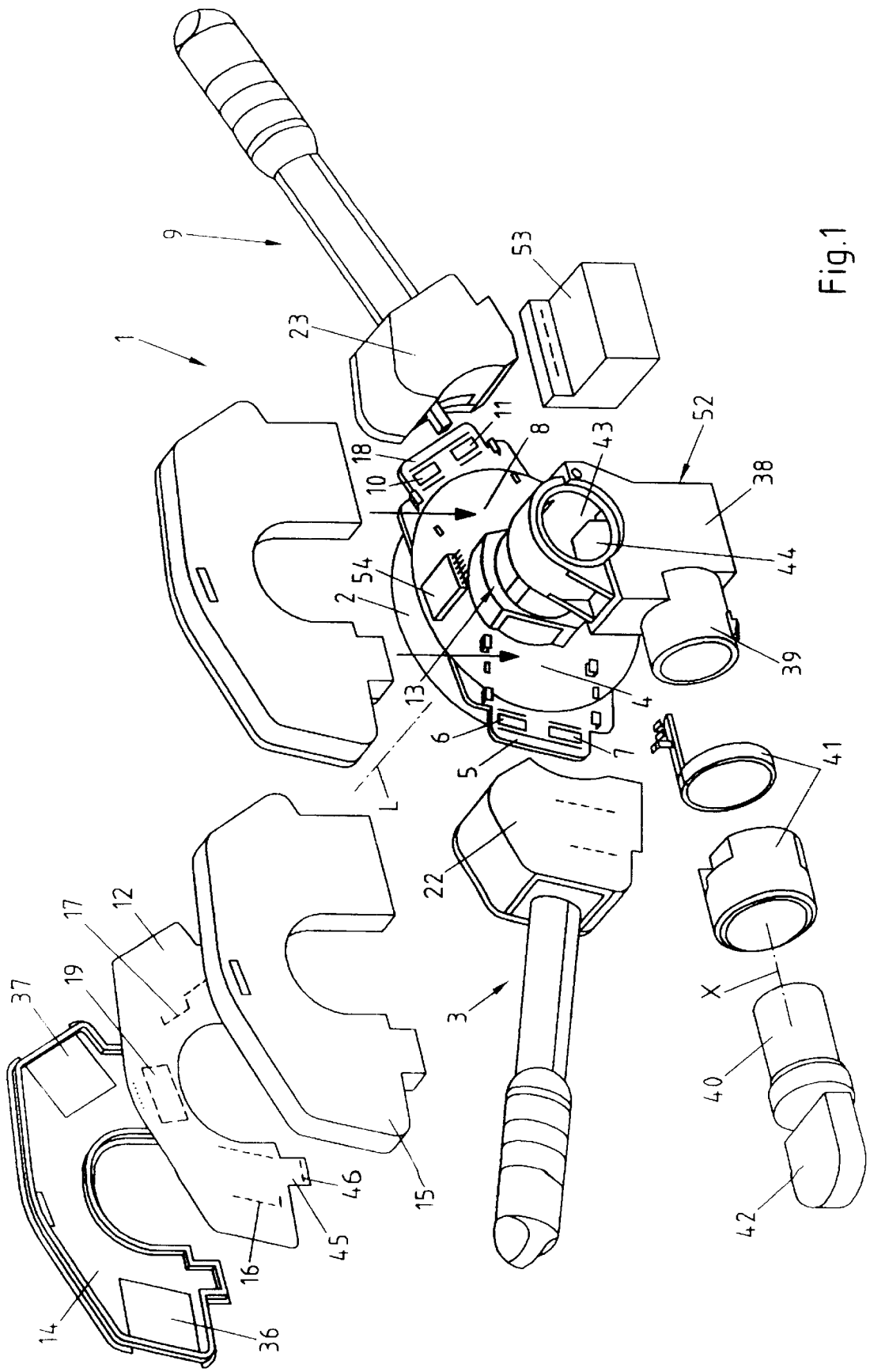
FIG. 1 shows an exploded view of an embodiment of a steering column assembly for attachment to a steering column.

The steering column 1 shown in FIG. 1 comprises a central locating device 2 which can be placed upon a jacket tube (not shown) of a steering column (also not shown). To this effect, a central aperture is shaped into the locating device 2, the diameter of which corresponds with the exterior diameter of the jacket tube (not shown).

On the locating device 2, a first radially-aligned receptacle 4 is provided for a first steering column switch 3. In the region of a lateral surface of receptacle 4, in a flexible tongue 5, shaped to a lateral margin of receptacle 4, there are two click-lock apertures 6, 7. Axial-symmetrically to the longitudinal axis L of the locating device 2, there is a second receptacle 8 for a second steering column lever 9. Corresponding to receptacle 4, receptacle 8 in the region of its lateral surface comprises a flexible tongue 18 into which click-lock apertures 10, 11 have been formed.

In order to attach a U-shaped support board 12 configured as an electronics printed circuit board to the locating device 2, a slot-receptacle 13 is provided. To this effect, the support board 12 is placed in a positive-locking way into a housing comprising two housing halves 14, 15, the U-shape of which corresponds to the U-shape of the support board 12. Subsequently, the support board 12 is inserted with the surrounding housing 14, 15 from radial direction into the slot receptacle 13. In the condition inserted into the slot receptacle 13 of the locating device 2, the support board 12 is positioned into the housing halves 14, 15 surrounding it, in a plane normally positioned along the longitudinal axis L of the locating device 2.

On the side facing the housing half 14 of the support board 12, which in the condition where the support board 12 is attached to the locating device 2, is allocated to the housings 22, 23 of the steering column switches 3, 9, there are microswitches 16, 17 (shown by dotted lines). These microswitches 16, 17 can be operated by way of suitable control means of the steering column switches 3, 9. The steering column switches 3, 9 themselves do not have their own elements establishing an electrical connection. They only comprise the mechanical components necessary to activate the microswitches 16, 17. The steering column switches 3, 9 and the respective microswitches 16, 17 allocated to them jointly constitute a functional steering column switch in which constructional separation of mechanical and electrical parts is realized. This constructional separation leads to significant simplification in installing and deinstalling the steering column switch in the case of repair or similar.

By way of strip conductors (not shown) of the support board 12, the microswitches 16, 17 are connected with the electronic components arranged on the support board 12, including control devices 19. For example the vehicle's lights, turn signal indicator, windscreen wiper device etc. are controlled depending on the swivel position of the steering column switch 3 or 9.

Figure 2:
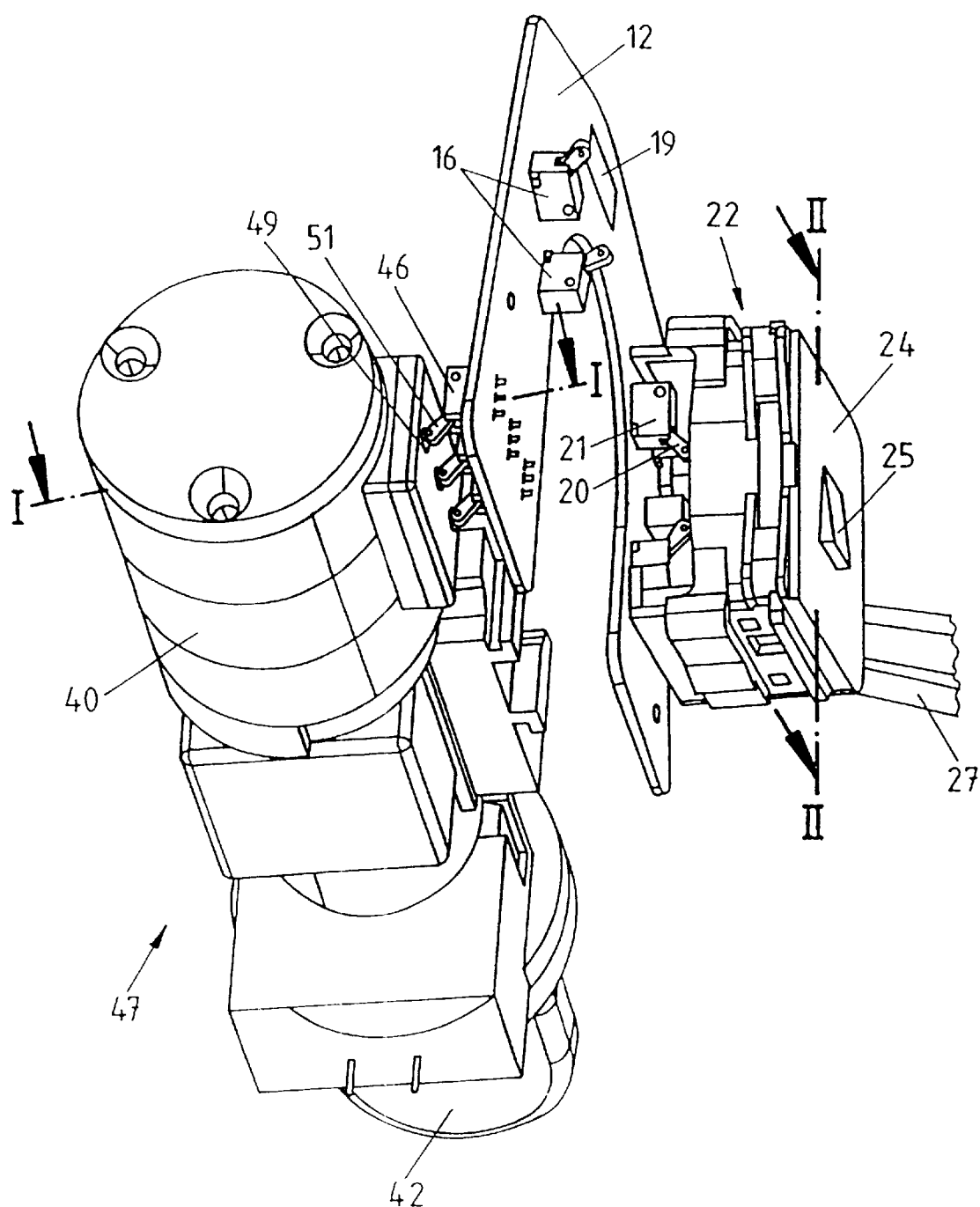
FIG. 2 shows a perspective view of embodiments of a support board, of a steering column switch and a cylinder lock switch pertaining to the embodiment of a steering column assembly shown in FIG. 1.
Figure 3:
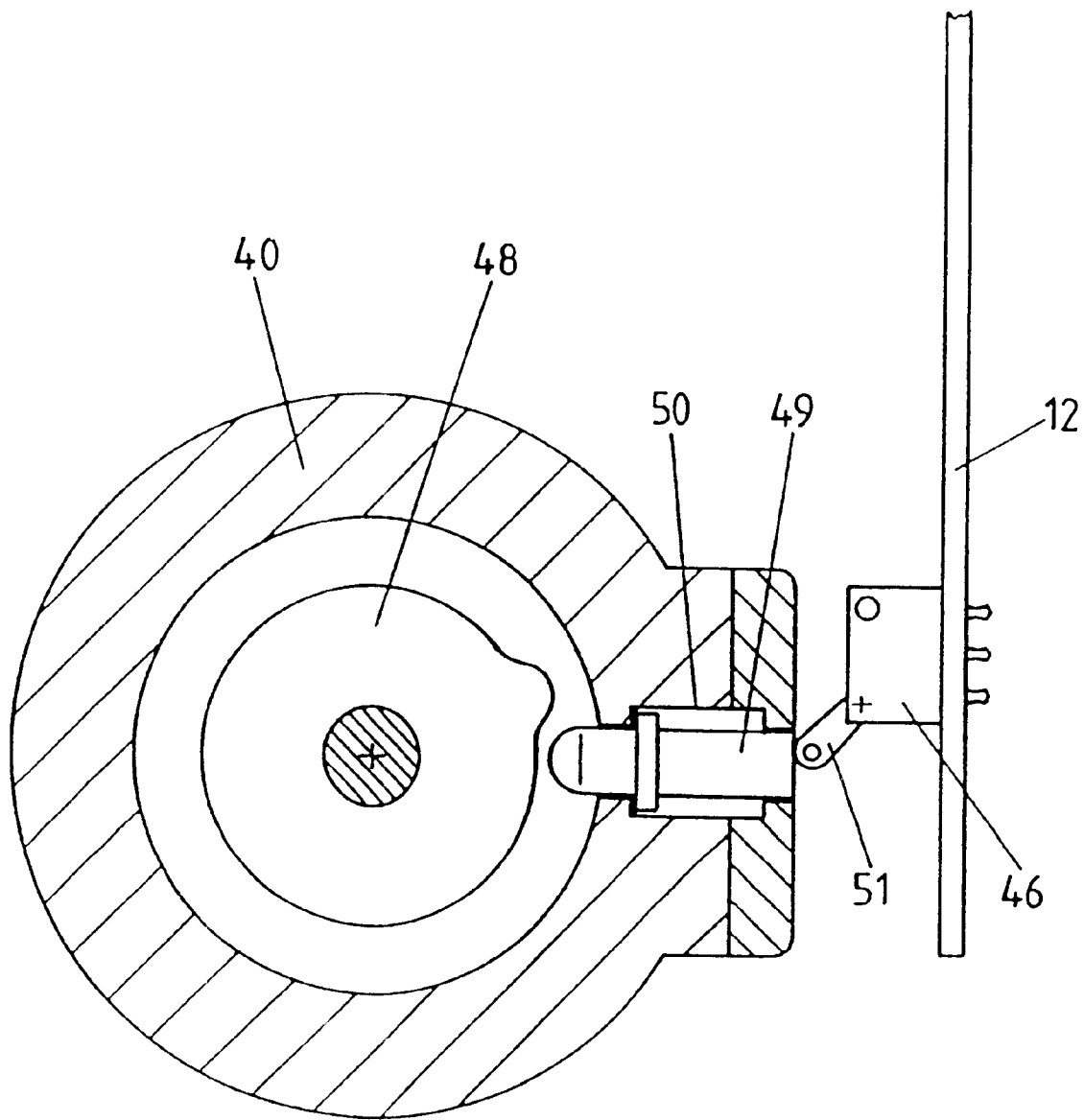
FIG. 3 is a section view along the line I—I of FIG. 2.

To activate a microswitch 16, 17, the steering column switch 3, 9 is swivelled to such an extent that a control means shaped to it, for example a pin or cam, contacts a feeler 20 of a microswitch 21 (compare FIG. 2). If the feeler 20 of the microswitch 21 is depressed, depending on the function of the respective microswitch 21, an electrical connection is established or separated.

The housing 22 or 23 of the steering column switch 3 or 9 can be inserted into the receptacles 4, 8. Laterally arranged guide means ensure that they can be inserted into the respective receptacle 4, 8 only in a particular position. The cover wall 24 allocated to the tongues 5 or 18 of the housings 22, 23 comprises click-stop protrusions 25 (compare FIG. 2). Where the housings 22 or 23 are inserted into the receptacles 4, 8, the said click-stop protrusions 25 interact with the respective click-stop apertures 6, 7 or 10, 11, in such a way that the steering column switches 3, 9 are securely retained to the locating device 2. In order to separate the steering column switch 3, 9 from the locating device 2 again, the connection between the tongues 5, 18 and the click stops of the housings 22, 23 can be undone by bending back the respective tongues 5, 18.

Figure 5:
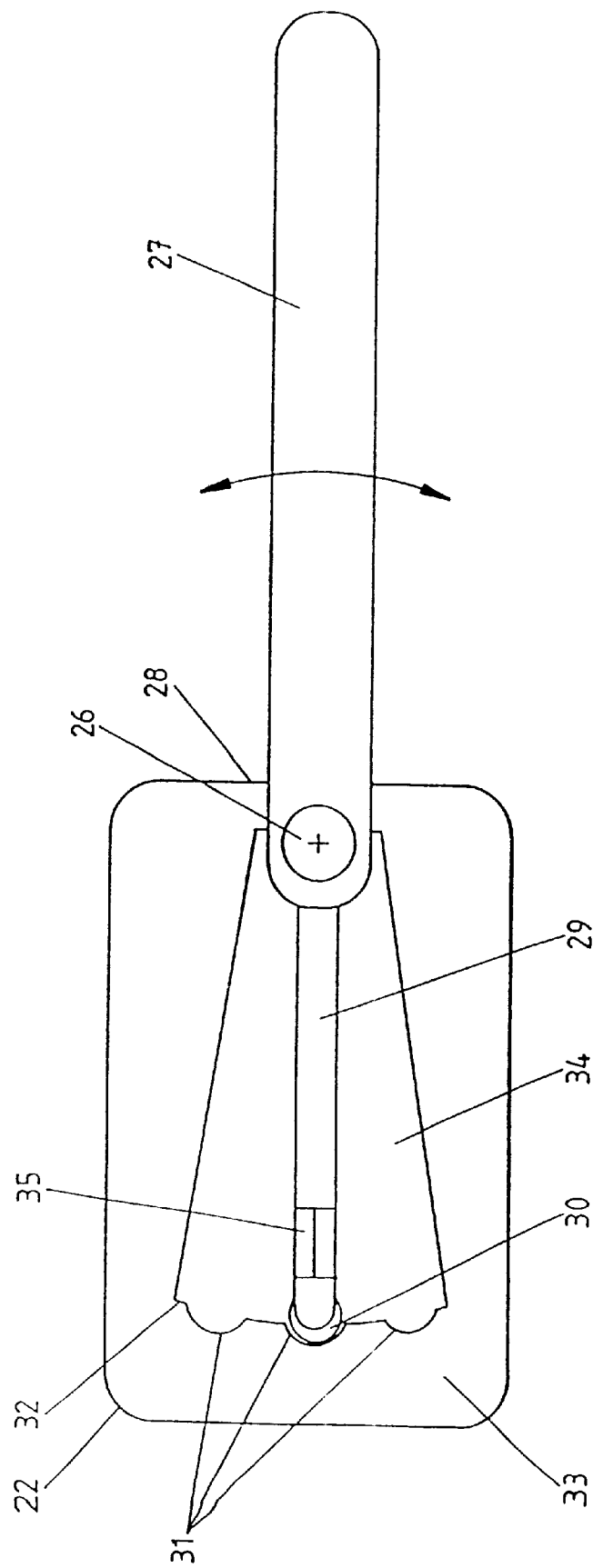
FIG. 5 shows a lateral view of the embodiment of a steering column switch.

As is depicted in FIG. 5, one control lever 27 each is swivellably retained on a swivel axis 26. The swivel axis 26 is arranged in the region of the wall 28 which, if the housing 22 or 23 is inserted into the receptacle 4 or 8, is facing outward. The wall 28 comprises a window through which the respective control lever 27 leads out of the housing 22, 23. The control lever 27 comprises an extension 29 protruding into the respective housing 22, 23.

At the tip of the extension 29 a wheel 30 is hinged in such a way that its turning axis is normally aligned to the longitudinal axis of the respective control lever 27. In this, the wheel 30 movably arranged in longitudinal direction of the control lever 27 and by means of the force of an elastic element (not shown), is pushed towards an arc-shaped marginal section 32 comprising three click stops 31 spaced apart in regular angular spacing, of a recess 34 in a closed lateral wall 33 of the housing 22, 23. The click stops 31 define three switch positions for the respective control lever 27 of the steering column switches 3, 9.

Figure 4:
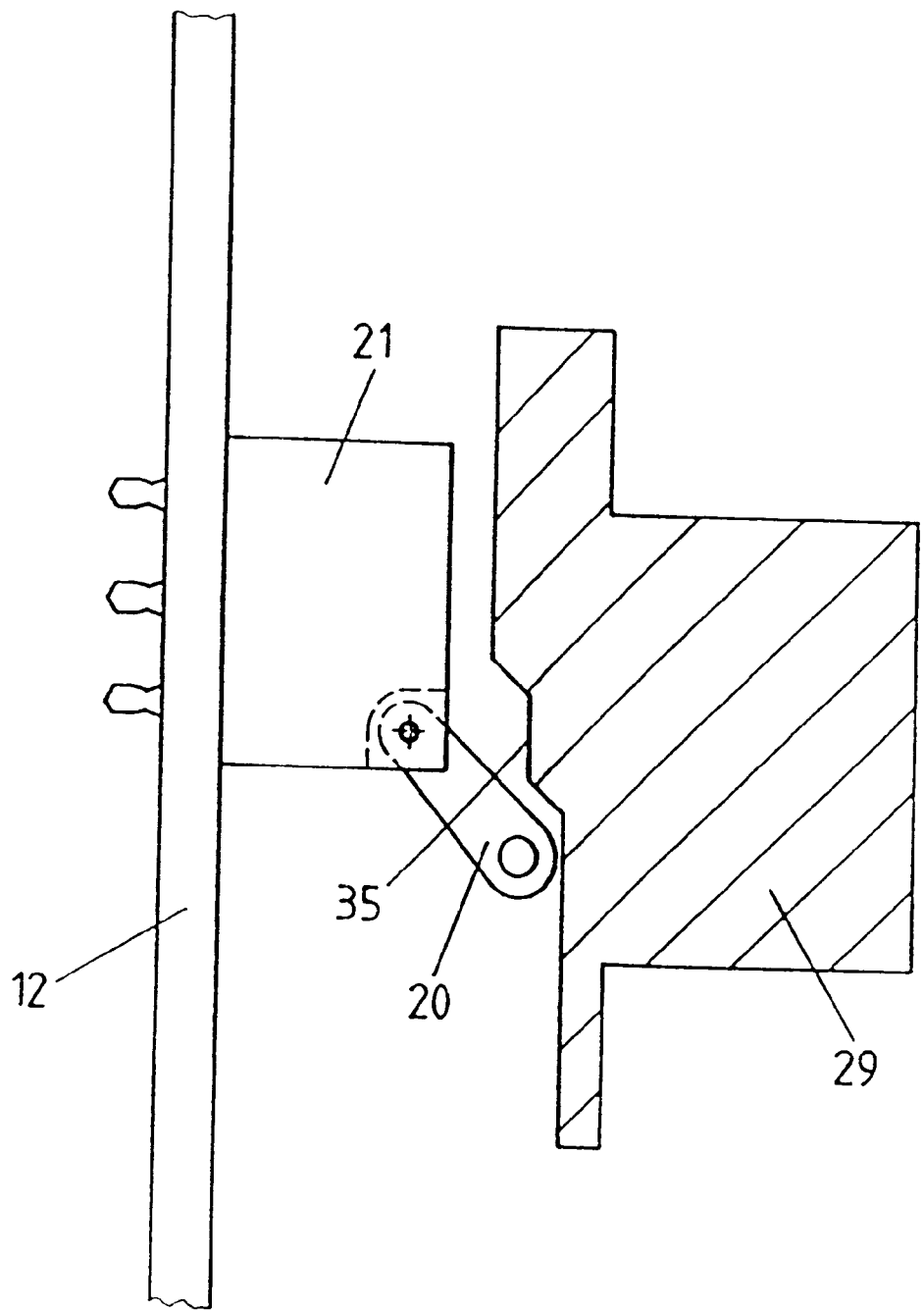
FIG. 4 is a section view along the line II—II of FIG. 2.

The surface of the extension 29 facing away from the first cover wall 24, in the region of its free end, comprises a step-shaped raised part 35 (compare FIGS. 4 and 5) whose bevelled surfaces drop towards the elongated sides of the extension 29. The second cover wall of the housings 22 or 23 comprises a window the size of which corresponds to at least the area covered by the raised part 35 during a full sweep of the control lever 27, 29.

The switch elements configured as microswitches 16, 17 on the side of the support board 12 which in a condition fixed to the locating device 2 is allocated to the housings 22, 23 (FIG. 2) are arranged in angular spacings corresponding to the angular spacings between the click stops 31.

If the support board 12 embedded in the housing halves 14, 15 is inserted into the slot-receptacle 13, and the steering column switches 3, 9 are inserted into the receptacles 4 or 8 in the locating device 2, the housing 22 or 23 covers the window 36, 37 allocated to the respective steering column lever 3, 9 of the respective housing half 14, so that the microswitches 16, 17 positioned in these windows are effectively protected from dirt.

As already mentioned, the microswitches 16, 17 are connected by way of strip conductors (not shown in detail) of the support board 12, with control devices 19 also arranged on the support board 12.

To activate one of these control devices 19, the control lever 27 is swivelled until the wheel 30 reaches the position, determined by one of the click stops 31, which corresponds to the desired function. As soon as this swivel position is reached, the feeler 20 of the microswitch 21 allocated to this position is depressed by the raised part 35 of the lever extension 29. As already mentioned, an electrical connection is established or separated in this way, depending on the function of the respective microswitch 21.

With the embodiment of a steering column assembly 1 according to the invention, the locating device 2 comprises an extension section 38 aligned coaxially to its longitudinal axis L. A lock receptacle 39 is shaped to the extension section 38. This lock receptacle 39 retains a lock cylinder 40 by means of a two-piece retainer 41. The lock cylinder 40 can be turned by means of a key 42 around a rotation axis X, shown in dashes in FIG. 1.

In addition, the extension section 38 of the locating device 2 comprises an aperture 43 arranged coaxially to the aperture of the locating device 2. The steering shaft (not shown) of the steering column (also not shown) leads through the said aperture 43. With the key 42 removed and in the respective steering position, the steering shaft (not shown) can be locked in the traditional way by means of a wedge 44. Beside the microswitches 16, 17 allocated to the steering column switches 3, 9, the support board 12 in the region of the section 45 of the support board 12, adjacent to the lock receptacle 39, comprises three microswitches 46 aligned in a row beside each other and spaced apart. By way of strip conductors of the support boards 12, the microswitches 46 are also connected to control devices (not shown) arranged on the support board 12. For example the starter motor (not shown) of the vehicle is controlled by the said control devices.

The microswitches 46 constitute the electrical part of a cylinder lock switch 47 (compare FIG. 2) which can be activated by turning the lock cylinder 40 acting as a control. Cams 48 arranged with the lock cylinder 40 on the rotation axis of the lock cylinder 40 in various angular positions are provided to transmit the switching motion to the microswitches 46. Located on these cams 48 are the ends of pins 49 which are guided into the apertures 50 of the lock receptacle 39. In this, the apertures 50 are positioned in such a way that the other end of the respective pin 49 is in contact with the feeler 51 of the respective microswitch 46. Just as is the case with the steering column switches 3, 9, with a cylinder lock switch 47 according to the invention, the principle of separating the mechanical part from the electrical part is thus realized. This allows installation and replacement of the mechanical part (lock cylinder 40 with cams 48 and pins 49) independent from the electrical part (microswitches 46) borne by the support board 12.

Depending on the rotational position of the lock cylinder 40, the pins 49 are pushed out of the cam 48 allocated to each of them and push against the feeler 51 of the respective microswitch 46. Subsequently the said microswitch establishes an electrical connection or else it separates it.

At the side of the locating device 2 located opposite the aperture of the lock receptacle 39, coaxially to the rotary axis X of the cylinder lock 40, there is a receptacle 52 for a detection and control unit 53 of a drive-away security device (not shown) or an immobilizer. For example, the detection and control unit 53 excites a transponder borne by the key 42 and depending on the signal received, for starting the vehicle, removes the drive-away lock. The electronic components required to carry out this function are also arranged on the support board 12.

In addition, the support board 12 accommodates a turning angle sensor for detecting the steering angle. Here too, the principle is realized of concentrating all elements required for electrical function on the support board 12, with only the movable mechanical components being spatially separated from them. Also a torque registering device or a device for transmitting a control signal for an airbag can be provided, with the respective electronic or electrical control device of the said torque registering device or device for transmitting a control signal for an airbag also being positioned on the support board 12. To communicate between the electrical control unit and the functional elements of the vehicle, the support board 12 comprises a data-bus interface 54 by way of which the synchronous or asynchronous control data can be transmitted to the individual functional groups of the vehicle. Coupling with a high-frequency radio remote-control of a vehicle can also take place via the centrally arranged electrical control unit, in that the receiver for the HF remote control is also accommodated on the support board 12. This is advantageous because the region below the steering wheel is preferably accessible for HF radiation from outside.

What is claimed is:

1. A steering column assembly for arranging in the area of a steering column in a motor vehicle, comprising:

a locating device;

a centrally arranged support board; and at least one steering column switch;

whereby the locating device comprises a receptacle for the support board and at least one laterally-aligned receptacle for the steering column switch;

the support board establishes electrical connection between connections of the steering column switch and control devices allocated to the steering column switch of the vehicle;

the control devices allocated to the steering column switch are at least in part arranged on the support board;

wherein the receptacle for the support board is radially aligned, and the support board is connected to the locating device from a radial direction.

2. A steering column assembly of claim 1, wherein the support board is U-shaped.

3. A steering column assembly of claim 1, wherein the support board can be inserted into a slot provided in the locating device or can be put on the locating device.

4. A steering column assembly of claim 1, wherein the locating device comprises a lock receptacle for a cylinder lock switch, and electrical connection between connections of the cylinder lock switch and control devices allocated to the cylinder lock switch of the vehicle, is maintained by way of the support board.

5. A steering column assembly of claim 1, wherein at least one of the steering column switch and the cylinder lock switch is disconnectably connectable with the locating device, the at least one of the steering column switch and the cylinder lock switch comprises a control, wherein the control, depending on a manually selectable position, by way of a control means, acts upon at least one switch element causing signal transmission, and wherein the switch element is arranged on the support board.

6. A steering column assembly of claim 5, wherein the switch element can be operated in a mechanical, photoelectrical, inductive, capacitive or magnetic way.

7. A steering column assembly of claim 5, wherein the switch element is a microswitch.

8. A steering column assembly of claim 5, wherein the steering column switch is connected to a receptacle for a steering column switch of the locating device by means of a connective element and wherein the control is retained at the connective element.

9. A steering column assembly of claim 8, wherein the control means are connected to the connective element.

10. A steering column assembly of claim 8, wherein the connective element and elements connected to the connective element are made from identical material.

11. A steering column assembly of claim 8, wherein the connective element is a housing having click-stop protrusions which engage click-stop apertures of the locating device.

12. A steering column assembly of claim 5, wherein the control means is selected from the group consisting of an axially-movable pin, a rotatably-held cam, and a raised part shaped to the control.

13. A steering column assembly of claim 5, wherein the control is retained in a hingeable way.

14. A steering column assembly of claim 5, wherein the control is retained in a linear-movable way.

15. A steering column assembly of claim 5, wherein the control is retained in a rotatable way.

16. A steering column assembly of claim 5, wherein the cylinder lock switch is connected with a lock receptacle of the locating device by way of a connective element and wherein the cylinder lock switch comprises a lock cylinder as the control.

17. A steering column assembly of claim 16, wherein the control means is formed by at least one cam arranged on a rotational axis of the lock cylinder and wherein the at least one cam interacts with the switch element arranged on the support board.

18. A steering column assembly of claim 5, wherein the control devices allocated to the at least one of the steering column switch and the cylinder lock switch are at least partly arranged on the support board, which is configured as a printed circuit board, and the control devices, depending on a switch condition of the switch element, are controllable.

19. A steering column assembly of claim 1, wherein the locating device is made from a plastic material.

20. A steering column assembly of claim 19, wherein a wall of the lock receptacle is reinforced, at least in sections, by reinforcement elements embedded in the plastic material.

21. A steering column assembly of claim 1, wherein sections of outer walls of the locating device form a cover of the steering column which is visible from outside.

* * * * *